US006974853B2

(12) United States Patent
Husemann et al.

(10) Patent No.: US 6,974,853 B2
(45) Date of Patent: Dec. 13, 2005

(54) ACRYLATE CONTACT ADHESIVE MATERIALS HAVING TIGHT MOLECULAR WEIGHT DISTRIBUTION

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/343,181

(22) PCT Filed: Jul. 27, 2001

(86) PCT No.: PCT/EP01/08743

§ 371 (c)(1),
(2), (4) Date: Jun. 19, 2003

(87) PCT Pub. No.: WO02/10226

PCT Pub. Date: Feb. 7, 2002

(65) Prior Publication Data

US 2004/0092685 A1 May 13, 2004

(30) Foreign Application Priority Data

Jul. 28, 2000 (DE) ........................................ 100 36 801

(51) Int. Cl.[7] .................................................. C08F 2/00

(52) U.S. Cl. .................... 526/220; 526/204; 526/219.6; 526/229; 546/112; 546/141; 546/184; 548/542; 564/300; 564/301

(58) Field of Search ................................ 526/220, 204, 526/219.6, 229; 546/141, 184, 112; 564/300, 301; 548/542

(56) References Cited

U.S. PATENT DOCUMENTS

| | | | | |
|---|---|---|---|---|
| 4,581,429 A | | 4/1986 | Solomon et al. | 526/220 |
| 5,547,614 A | * | 8/1996 | Fesman et al. | 252/609 |
| 5,767,210 A | | 6/1998 | Lecomte et al. | 526/166 |
| 5,789,487 A | | 8/1998 | Matyjaszewski et al. | 525/301 |
| 5,811,500 A | | 9/1998 | Dubois et al. | 526/145 |
| 5,854,364 A | | 12/1998 | Senninger et al. | 526/192 |
| 5,919,871 A | | 7/1999 | Nicol et al. | 525/333.8 |
| 5,945,491 A | | 8/1999 | Matyjaszewski et al. | 526/111 |
| 6,114,482 A | | 9/2000 | Senninger et al. | 526/172 |

FOREIGN PATENT DOCUMENTS

| | | | |
|---|---|---|---|
| DE | 198 45 298 A1 | 4/2000 | C07D/265/34 |
| DE | 199 49 352 A1 | 4/2000 | C07D/241/52 |
| DE | 198 58 103 A1 | 6/2000 | C08F/4/34 |
| EP | 0 135 280 A2 | 7/1994 | C08F/4/00 |
| EP | 0 735 052 A2 | 10/1996 | C08F/2/38 |
| EP | 0 824 110 A1 | 2/1998 | C08F/4/00 |
| EP | 0 824 111 A1 | 2/1998 | C08F/4/00 |
| EP | 0 826 698 A1 | 3/1998 | C08F/4/00 |
| EP | 0 841 346 A1 | 5/1998 | C08F/4/00 |
| EP | 0 850 957 A1 | 7/1998 | C08F/4/40 |
| GB | 2 342 649 A | 4/2000 | C07D/233/30 |
| WO | WO 96/24620 | 2/1996 | C08F/4/00 |
| WO | WO 98/01478 | 1/1998 | C08F/2/38 |
| WO | WO 98/13392 | 4/1998 | C08F/4/00 |
| WO | WO 98/30601 | 7/1998 | C08F/4/00 |
| WO | WO 98/44008 | 10/1998 | C08F/2/38 |
| WO | WO 99/03894 | 1/1999 | C08F/2/00 |
| WO | WO 99/31144 | 6/1999 | C08F/2/38 |

* cited by examiner

*Primary Examiner*—Tatyana Zalukaeva
(74) *Attorney, Agent, or Firm*—Norris McLaughlin & Marcus PA

(57) ABSTRACT

An initiator system for radical polymerization, which comprises a combination of compounds of the formulae:

(I)

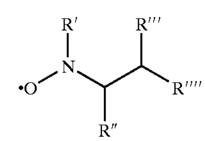

(II)

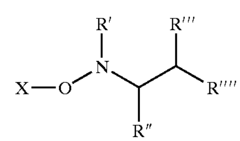

10 Claims, No Drawings

ACRYLATE CONTACT ADHESIVE MATERIALS HAVING TIGHT MOLECULAR WEIGHT DISTRIBUTION

This is a 371 of PCT/EP01/08743 filed Jul. 27, 2001 (international filing date).

The invention relates to an initiator system based on nitroxides for free-radical polymerization of (meth)acrylic acid and/or derivatives thereof and to a process for preparing acrylic pressure sensitive adhesives (PSAs) with narrow molecular weight distribution using said initiator system.

For industrial PSA tape applications it is very common to use polyacrylate PSAs. Polyacrylates possess a variety of advantages over other elastomers. They are highly stable toward UV light, oxygen, and ozone. Synthetic and natural rubber adhesives normally contain double bonds, which make these adhesives unstable to the aforementioned environmental effects. Another advantage of polyacrylates is their transparency and their serviceability within a relatively wide temperature range.

Polyacrylate PSAs are generally prepared in solution by free radical polymerization. The polyacrylates are generally applied to the corresponding backing material from solution using a coating bar, and then dried. In order to increase the cohesion, the polymer is crosslinked. Curing proceeds thermally or by UV crosslinking or by EB curing (EB: electron beams). The operation described is relatively costly and ecologically objectionable, since as a general rule the solvent is not recycled and the high consumption of organic solvents represents a high environmental burden.

Moreover, it is very difficult to produce PSA tapes with a high adhesive application rate without bubbles.

One remedy to these disadvantages is the hotmelt process in this process, the PSA is applied to the backing material from the melt.

However, this new technology has its limitations. Prior to coating, the solvent is removed from the PSA in a drying extruder. The drying operation is associated with a relatively high temperature and shearing effect, so that high molecular weight polyacrylate PSAs in particular are severely damaged. The acrylic PSA gels, or the low molecular weight fraction is greatly enriched as a result of molecular weight breakdown. Both effects are undesirable, since they are disadvantageous for the application. Either the adhesive can no longer be applied, or there are changes in its technical adhesive properties, since, for example, when a shearing force acts on the adhesive the low molecular weight fractions act as lubricants and so lead to premature failure of the adhesive.

One solution to mitigating these disadvantages is offered by polyacrylate adhesives with a low average molecular weight and narrow molecular weight distribution. In this case the fraction of low molecular weight and high molecular weight molecules in the polymer is greatly reduced by the polymerization process. The reduction in the high molecular weight fractions reduces the flow viscosity, and the adhesive shows less of a tendency to gel. As a result of the reduction in the low molecular weight fraction, the number of oligomers which reduce the shear strength of the PSA is lessened.

A variety of polymerization methods are suitable for preparing low molecular weight PSAs. The state of the art is to use regulators, such as alcohols or thiols, for example (Makromoleküle, Hans-Georg Elias, 5th Edition, 1990, H üthig & Wepf Verlag, Basel). These regulators reduce the molecular weight but broaden the molecular weight distribution.

Another controlled polymerization method used is atom transfer radical polymerization ATRP, in which initiators used preferably include monofunctional or difunctional secondary or tertiary halides and, for abstracting the halide(s), complexes of Cu, Ni, Fe, Pd, Pt, Ru, Os, Rh, Co, Ir, Cu, Ag or Au [EP 0 824 111; EP 0 826 698; EP 0 824 110; EP 0 841 346; EP 0 850 957]. The various possibilities of ATRP are further described in U.S. Pat. No. 5,945,491, U.S. Pat. No. 5,854,364, and U.S. Pat. No. 5,789,487. Generally, metal catalysts are used, which have the side effect of adversely influencing the aging of the PSAs (gelling, transesterification). Moreover, the majority of metal catalysts are toxic, discolor the adhesive, and can be removed from the polymer only by complicated precipitations.

A further variant is the RAFT process (reversible addition-fragmentation chain transfer). The process is described at length in WO 98/01478 and WO 99/31144, but in the manner set out therein is unsuited to the preparation of PSAs, since the conversions achieved are very low and the average molecular weight of the polymers prepared is too low for acrylic PSAs. Accordingly, the polymers described cannot be used as acrylic PSAs.

U.S. Pat. No. 4,581,429 discloses a controlled free-radical polymerization process. As its initiator the process employs a compound of the formula R'R"N—O—X, in which X denotes a free radical species which is able to polymerize unsaturated monomers. In general, however, the reactions have low conversion rates. A particular problem is the polymerization of acrylates, which takes place only with very low yields and molecular weights.

WO 98/13392 describes open-chain alkoxyamine compounds which have a symmetrical substitution pattern.

EP 735 052 A1 discloses a process for preparing thermoplastic polymers having narrow polydispersities.

WO 96/24620 describes a polymerization process in which very specific radical compounds, such as phosphorus-containing nitroxides, for example, are described.

WO 98/30601 discloses specific nitroxyls, based on imidazolidine.

WO 98/4408 discloses specific nitroxyls, based on morpholines, piperazinones, and piperazinediones.

DE 199 49 352 A1 discloses heterocyclic alkoxyamines as regulators in controlled free-radical polymerizations. Corresponding further developments of the alkoxyamines or of the corresponding free nitroxides improved the efficiency for the preparation of polyacrylates. [Hawker, C. J., paper, National Meeting of the American Chemical Society in San Francisco, Spring 1997; Husemann, M., IUPAC World-Polymer Meeting 1998, Gold Coast, Australia, paper on "Novel Approaches to Polymeric Brushes using 'Living' Free Radical Polymerizations" (July 1998)]

In the abovementioned patents and papers attempts were made to improve the control of free-radical polymerization reactions. There nevertheless exists a need for a nitroxide-controlled polymerization process which is highly reactive and can be used to realize high conversions in combination with high molecular weight and low polydispersity. This applies in particular to the copolymerization of acrylic PSAs, where high molecular weights are essential for PSA applications.

It is an object of the invention, therefore, to provide an initiator system for a corresponding polymerization process, and to offer a polymerization process, which does not have the disadvantages of the aforementioned prior art, or at least not to so great an extent.

Surprisingly it has been found that asymmetric alkoxyamines of type (II), in conjunction with their free nitroxyl precursors and a slow-thermal-decomposition azo or peroxo initiator, allow polymerization for the preparation of acrylic PSAs very effectively and rapidly at relatively high temperatures.

Claim 1 accordingly provides an initiator system for free-radical polymerizations, composed of a combination of compounds of the general formulae (I)

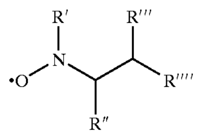

(II)

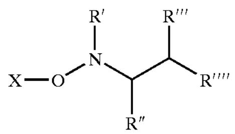

in which

R', R", R'", R"" are chosen independently of one another and are a) branched and unbranched $C_1$ to $C_{18}$ alkyl radicals; $C_3$ to $C_{18}$ alkenyl radicals; $C_3$ to $C_{18}$ alkynyl radicals;

b) $C_3$ to $C_{18}$ alkynyl radicals; $C_3$ to $C_{18}$ alkenyl radicals; $C_1$ to $C_{18}$ alkyl radicals substituted by at least one OH group or a halogen atom or a silyl ether;

c) $C_2$–$C_{18}$ hetero alkyl radicals having at least one oxygen atom and/or an NR group in the carbon chain; R being chosen from one of groups a), b), and d) to g), d) $C_3$–$C_{18}$ alkynyl radicals, $C_3$–$C_{18}$ alkenyl radicals, $C_1$–$C_{18}$ alkyl radicals substituted by at least one ester group, amine group, carbonate group and/or epoxide group and/or by sulfur and/or by sulfur compounds, especially thioethers or dithio compounds;

e) $C_3$–$C_{12}$ cycloalkyl radicals f) $C_6$–$C_{10}$ aryl radicals g) hydrogen;

X represents a group with at least one carbon atom and is such that the free radical X• derived from X is able to initiate a polymerization of ethylenically unsaturated monomers.

Halogens are preferably F, Cl, Br or I, more preferably Cl and Br. As alkyl, alkenyl and alkyl radicals in the various substituents, both linear and branched chains are outstandingly suitable.

Examples of alkyl radicals containing from 1 to 18 carbon atoms are methyl, ethyl, propyl, isopropyl, butyl, isobutyl, t-butyl, pentyl, 2-pentyl, hexyl, heptyl, octyl, 2-ethylhexyl, t-octyl, nonyl, decyl, undecyl, tridecyl, tetradecyl, hexadecyl and octadecyl.

Examples of alkenyl radicals having from 3 to 18 carbon atoms are propenyl, 2-butenyl, 3-butenyl, isobutenyl, n-2, 4-pentadienyl-, 3-methyl-2-butenyl, n-2-octenyl, n-2-dodecenyl, isododecenyl and oleyl.

Examples of alkynyl having from 3 to 18 carbon atoms are propynyl, 2-butynyl, 3-butynyl, n-2-octynyl and n-2-octadecynyl.

Examples of hydroxyl-substituted alkyl radicals are hydroxypropyl, hydroxybutyl or hydroxyhexyl.

Examples of halogen-substituted alkyl radicals are dichlorobutyl, monobromobutyl or trichlorohexyl.

An example of a suitable $C_2$–$C_{18}$ hetero alkyl radical having at least one oxygen atom in the carbon chain is —$CH_2$—$CH_2$—O—$CH_2$—$CH_3$.

Examples of $C_3$–$C_{12}$ cycloalkyl radicals include cyclopropyl, cyclopentyl, cyclohexyl or trimethylcyclohexyl.

Examples of C6–C10aryl radicals include phenyl, naphthyl, benzyl, or further substituted phenyl radicals, such as ethyl, toluene, xylene, mesitylene, isopropylbenzene, dichlorobenzene or bromotoluene.

The above listings serve only as examples of the respective groups of compounds, and make no claim to completeness.

In one particularly preferred embodiment of the invention a combination of the compounds (Ia) and (IIa) is used as initiator system.

(Ia)

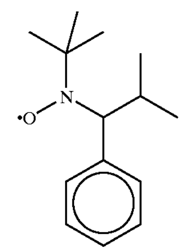

(IIa)

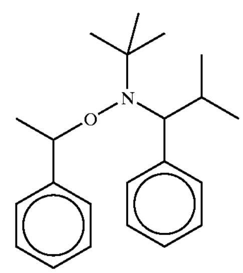

In one very advantageous further development of the inventive initiator system, further free-radical initiators for the polymerization are present in addition, especially thermally decomposing radical-forming azo or peroxo initiators. In principle, however, all customary initiators which are known for acrylates are suitable for this purpose. The production of C-centered radicals is described in Houben Weyl, Methoden der Organischen Chemie, Vol. E 19a, pp. 60–147. These methods are employed, preferentially, in analogy.

Examples of radical sources are peroxides, hydroperoxides, and azo compounds; some nonlimiting examples of typical radical initiators that may be mentioned here include potassium peroxodisulfate, dibenzoyl peroxide, cumene hydroperoxide, cyclohexanone peroxide, di-t-butyl peroxide, azodiisobutyronitrile, cyclohexylsulfonyl acetyl peroxide, diisopropyl percarbonate, t-butyl peroctoate, benzpinacol. In one very preferred version, 1,1'-azobis (cyclohexanecarbonitrile) (Vazo 88™ from DuPont) is used as free-radical initiator.

The compounds of the formula (II) are present preferably in an amount of from 0.0001 mol % to 1 mol %, more preferably in an amount of from 0.0008 to 0.0002 mol %, based on the monomers. The compounds of the formula (I) are present preferably in an amount of from 1 mol % to 10 mol %, more preferably in an amount of from 3 to 7 mol %, based on compound (II). The thermally decomposing initiator from c) is present with particular preference in an amount of from 1 to 10 mol %, more preferably in an amount of from 3 to 7 mol %, based on compound of the formula (II).

For initiation, the cleavage of the X—O bond of the initiator component of the formula (II) is essential. The cleavage of the bond is brought about preferably by ultrasound treatment, heating or exposure to electromagnetic radiation in the wavelength range of γ radiation, or by microwaves. More preferably the cleavage of the C—O bond is brought about by heating and takes place at a temperature of between 70 and 160° C.

After the polymerization step is over, the reaction mixture can be cooled to a temperature below 60° C., preferably to room temperature.

The invention further provides a process for preparing acrylic pressure sensitive adhesives, in which a monomer mixture composed to the extent of at least 70% by weight of ethylenically unsaturated compounds, especially of (meth) acrylic acid and/or derivatives thereof, is subjected to free-radical polymerization using the inventive initiator system described.

A preferred monomer mixture is one composed of at least 70% by weight of acrylic monomers of the general formula

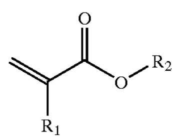

where $R_1$=H or $CH_3$ and $R_2$=H or is an alkyl chain having 1–20 carbon atoms.

In one advantageous embodiment of the inventive process vinyl compounds are used additionally as Monomers, with a fraction of up to 30% by weight, in particular one or more vinyl compounds chosen from the following group: vinyl esters, vinyl halides, vinylidene halides, nitrites of ethylenically unsaturated hydrocarbons.

Examples that may be mentioned here of such vinyl compounds include vinyl acetate, N-vinylformamide, vinylpyridines, acrylamides, acrylic acid, hydroxyethyl acrylate, hydroxyethyl methacrylate, ethyl vinyl ether, vinyl chloride, vinylidene chloride, acrylonitrile, maleic anhydride and styrene, without wishing to be unnecessarily restricted by this listing. It is also possible to use all other vinyl compounds which fall within the group specified above, and also all other vinyl compounds which do not fall within the classes of compounds specified above.

For the polymerization the monomers are chosen such that the resulting polymers can be used as industrially useful PSAs, especially in such a way that the resulting polymers possess pressure-sensitive adhesive properties in accordance with the "Handbook of Pressure Sensitive Adhesive Technology" by Donatas Satas (van Nostrand, New York 1989). For these applications, the static glass transition temperature of the resulting polymer is advantageously below 25° C.

The polymerization may be conducted in the presence of one or more organic solvents and/or in the presence of water. In one advantageous embodiment of the process there are additional cosolvents or surfactants present, such as glycols or ammonium salts of fatty acids.

Preferred processes use as little solvent as possible. Suitable organic solvents or mixtures of solvents are pure alkanes (hexane, heptane, octane, isooctane), aromatic hydrocarbons (benzene, toluene, xylene), esters (ethyl, propyl, butyl, or hexyl acetate), halogenated hydrocarbons (chlorobenzene), alkanols (methanol, ethanol, ethylene glycol, ethylene glycol monomethyl ether) and ethers (diethyl ether, dibutyl ether) or mixtures thereof. A water-miscible or hydrophilic cosolvent may be added to the aqueous polymerization reactions in order to ensure that the reaction mixture is present in the form of a homogeneous phase during monomer conversion. Cosolvents which can be used in advantage with the present invention are chosen from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivates, amino alcohols, ketones and the like, and also their derivatives and mixtures.

The polymers prepared preferably have an average molecular weight of 50 000 to 400 000 g/mol, more preferably between 100 000 and 300 000 g/mol. The average molecular weight is determined by size exclusion chromatography (SEC) or matrix-assisted laser desorption/ionization mass spectrometry (MALDI-MS). Depending on reaction regime, the acrylic PSAs prepared by this process have a polydispersity of $M_w/M_n<3.5$.

For the use of the polyacrylates prepared by the inventive process as pressure sensitive adhesives, the polyacrylates are optimized by optional blending with at least one resin. Tackifying resins to be added include without exception all existing tackifier resins described in the literature. Representatives that may be mentioned include pinene resins, indene resins and rosins, their disproportionated, hydrogenated, polymerized, esterified derivatives and salts, the aliphatic and aromatic hydrocarbon resins, terpene resins and terpene-phenolic resins, and also C5, C9 and other hydrocarbon resins. Any desired combinations of these and other resins may be used in order to adjust the properties of the resulting adhesive in accordance with what is desired. In general it is possible to use all resins which are compatible (soluble) with the corresponding polyacrylate; reference may be made in particular to all aliphatic, aromatic, alkylaromatic hydrocarbon resins, hydrocarbon resins based on pure monomers, hydrogenated hydrocarbon resins, functional hydrocarbon resins, and natural resins. Explicit reference is made to the depiction of the state of the art in the "Handbook of Pressure Sensitive Adhesive Technology" by Donatas Satas (van Nostrand, 1989).

In a further advantageous development one or more plasticizers are added to the PSA, such as low molecular weight polyacrylates, phthalates, whale oil plasticizers or plasticizer resins, for example.

The acrylic hotmelts may further be blended with one more additives such as aging inhibitors, light stabilizers, ozone protectants, fatty acids, resins, nucleators, blowing agents, compounding agents and/or accelerators.

They may further be admixed with one or more fillers such as fibers, carbon black, zinc oxide, titanium dioxide, solid or hollow glass (micro)beads, microbeads of other materials, silica, silicates and chalk, with the addition of blocking-free isocyanates being a further possibility.

Particularly for use as a pressure sensitive adhesive it is an advantage for the inventive process if the polyacrylate is applied preferably from the melt as a layer to a backing or to a backing material.

For this purpose the polyacrylates prepared as described above are concentrated to give a polyacrylate composition whose solvent content is ≦2% by weight. This process takes place preferably in a concentrating extruder. Then, in one advantageous variant of the process, the polyacrylate composition is applied in the form of a layer, as a hotmelt composition, to a backing or to a backing material.

Backing materials used for the PSA, for adhesive tapes for example, are the materials customary and familiar to the skilled worker, such as films (polyesters, PET, PE, PP, BOPP, PVC), nonwovens, foams, wovens and woven films, and also release paper (glassine, HDPE, LDPE). This list is not conclusive.

For the PSA utility it is particularly advantageous to crosslink the polyacrylates following application to the backing or to the backing material. For this purpose, in order to produce the PSA tapes, the polymers described above are optionally blended with crosslinkers. Crosslinking may be brought about, advantageously, either thermally or by means of high-energy radiation; in the latter case, particularly by means of electron beams (EB) or, following the addition of suitable photoinitiators, by means of ultraviolet radiation.

Preferred substances crosslinking under radiation in accordance with the inventive process are, for example, difunctional or polyfunctional acrylates or difunctional or polyfunctional urethane acrylates, difunctional or polyfunctional isocyanates or difunctional or polyfunctional epoxides. Further, it is also possible here to use any other difunctional or polyfunctional compounds which are familiar to the skilled worker and are capable of crosslinking polyacrylates.

Suitable photoinitiators preferably include Norrish type I and type II cleavers, some possible examples of both classes being benzophenone, acetophenone, benzil, benzoin, hydroxyalkylphenone, phenyl cyclohexyl ketone, anthraquinone, thioxanthone, triazine, or fluorenone derivatives, this list making no claim to completeness.

Also claimed is the use of the polyacrylate prepared by the inventive process as a pressure sensitive adhesive.

Particularly advantageous is the use of the polyacrylate PSA prepared as described for an adhesive tape, in which case the polyacrylate pressure sensitive adhesive may have been applied to one or both sides of a backing.

EXAMPLES

Test Methods

The following test methods were used in order to evaluate both the adhesive properties and general properties of the PSAs prepared.

180° Bond Strength Test (Test A)

A strip 20 mm wide of an acrylic PSA applied to polyesters as a layer was applied in turn to steel plates. The PSA strip was pressed down twice onto the substrate using a 2 kg weight. The adhesive tape was then immediately removed from the substrate at an angle of 180° and a speed of 300 mm/min. The steel plates were washed twice with acetone and once with isopropanol. The results are reported in N/cm and are averaged from three measurements. All measurements were carried out at room temperature.

Shear Strength (Test B)

A 13 mm wide strip of the adhesive tape was applied to a smooth steel surface which had been cleaned three times with acetone and once with isopropanol. The area of application measured 20 mm*13 mm (length*width). The adhesive tape was then pressed onto the steel backing four times using an applied pressure of 2 kg. At 80° C. a 1 kg weight, at room temperature a 1 kg or 2 kg weight, was fastened to the adhesive tape. The shear stability times measured are reported in minutes and correspond to the average of three measurements.

Gel Permeation Chromatography GPC (Test C)

The average molecular weight $M_w$ and the polydispersity PD were determined by the company Polymer Standards Service, Mainz. The eluent used was THF containing 0.1% by volume trifluoroacetic acid. Measurement was carried out at 25° C. The precolumn used was PSS-SDV, 5 $\mu$, $10^3$ Å, ID 8.0 mm×50 mm. Separation was carried out using the columns PSS-SDV, 5 $\mu$, $10^3$ and also $10^5$ and $10^6$ each with ID 8.0 mm×300 mm. The sample concentration was 4 g/l, the flow rate 1.0 ml per minute. Measurement was carried out against PMMA standards.

Determination of the Gel Fraction (Test D)

The carefully dried, solvent-free adhesive samples are welded into a pouch of polyethylene nonwoven (Tyvek web). From the difference in the sample weights before and after extraction with toluene the gel index is determined, i.e., the weight fraction of polymer that is not soluble in toluene.

Determination of the Conversion (Test E)

The conversion is determined gravimetrically and is reported as a percentage in relation to the amount by weight of the monomers used. The polymer is isolated by precipitation from methanol cooled to −78° C., filtered off and then dried in a vacuum cabinet. The polymer is weighed and its weight is divided by the initial weight of the monomers used. The calculated figure corresponds to the percentage conversion.

Implementation of the Hotmelt Process in a Recording Extruder:

The shearing and thermal loading of the acrylic hotmelts was carried out using the Rheomix 610p recording extruder from Haake. The drive unit available was the Rheocord RC 300p instrument. The instrument was controlled using the PolyLab System software. The extruder was charged in each case with 52 g of pure acrylic PSA (~80% fill level). The experiments were conducted at a kneading temperature of 140° C., a rotary speed of 40 rpm and a kneading time of 5 hours. Thereafter the samples, where possible, were dissolved again and the average molecular weight and the polydispersity of the material were determined via GPC.

Preparation of the nitroxide Ia (2,2,5-trimethyl-4-phenyl-3-azahexane 3-nitroxide):

The procedure adopted was analogous to the experimental instructions from Journal of American Chemical Society, 121, 16, 3904–3920, 1999.

Preparation of the alkoxyamine IIa (2,2,5-trimethyl-3-(1-phenylethoxy)-4-phenyl-3-azahexane):

procedure adopted was analogous to the experimental instructions from Journal of American Chemical Society, 121, 16, 3904–3920, 1999.

General Implementation of the Nitroxide-Controlled Polymerizations:

A mixture of the alkoxyamine IIa, the nitroxide Ia (5 mol % based on alkoxyamine IIa), and 2.5 mol % of Vazo 88™ (2.5 mol % based on alkoxyamine IIa) are mixed with the monomer (85% strength solution in xylene), and the mixture is degassed a number of times and then heated at 125° C. under an argon atmosphere. The reaction time is 24 h. Determination of molecular weight and polydispersity were carried out via GPC.

Production of the Reference Specimens

Example 1

A 2 L glass reactor conventional for free-radical polymerizations was charged with 28 g of acrylic acid, 292 g of 2-ethylhexyl acrylate, 40 g of methyl acrylate and 300 g of acetone/isopropanol (93:7). Nitrogen gas was passed through the reaction with stirring for 45 minutes, after which the reactor was heated to 580° C. and 0.2 g of azoisobutyronitrile (AIBN, Vazo 64™, DuPont) was added. Then the external heating bath was heated to 750° C. and the reaction was carried out constantly at this external temperature. After a reaction time of 1 hour a further 0.2 g of AIBN was added. After 3 hours and 6 hours, in each case 150 g of acetone/isopropanol (93:7) mixture were added for dilution. In order to reduce the remaining initiators, in each case 0.4 g of bis(4-tert-butylcyclohexanyl) peroxydicarbonate (Perkadox 16™, Akzo Nobel) was added after 8 hours and after 10 hours. After a period of 22 hours the reaction was terminated and the product cooled to room temperature.

The average molecular weight and the polydispersity were determined by means of test C.

In order to investigate the thermal aging, the adhesive was freed from the solvent in a vacuum drying cabinet and then subjected to shearing and thermal loading in the recording extruder in accordance with the method described above.

In order to examine the technical adhesive properties, the dried polyacrylate was applied to a 23 $\mu$m PET backing provided with Saran primer, application of the polyacrylate taking place at a rate of 50 g/m$^2$ using a laboratory roll coater, and the applied polyacrylate was then irradiated with 40 kGy at an acceleration voltage of 230 KV, using an EB unit from Crosslinking, and cured. For technical adhesive assessment, test methods A and B were conducted.

Example 2

The procedure of example 1 was repeated. The polymerization was carried out using 28 g of acrylic acid, 20 g of methyl acrylate, 20 g of styrene and 332 g of 2-ethylhexyl acrylate. The initial monomer concentration was raised to 80%.

Nitroxide-Controlled Polymerizations

Example 3

28 g of acrylic acid, 292 g of 2-ethylhexyl acrylate and 40 g of methyl acrylate were used. As initiators and regulators, 325 mg of alkoxyamine (IIa), 11 mg of nitroxide (Ia) and 12 mg of Vazo 88™ (DuPont) were admixed. The polymerization was conducted in accordance with the general implementation instructions for nitroxide-controlled polymerizations. For workup and further processing the procedure of Example 1 was adopted.

To determine the conversion, the polymerization was repeated and then the procedure of test method E performed.

Example 3'

28 g of acrylic acid, 292 g of 2-ethylhexyl acrylate and 40 g of methyl acrylate were used. As initiators and regulators, 325 mg of alkoxyamine (IIa) and 11 mg of nitroxide (Ia) were used. The monomers and the nitroxides are mixed in xylene (85% strength solution in xylene), and the solution is degassed a number of times and then heated at 125° C. under an argon atmosphere. The reaction time is 24 h. Thereafter the conversion was determined by test method E.

Example 4

28 g of acrylic acid, 20 g of methyl acrylate, 20 g of styrene and 332 g of 2-ethylhexyl acrylate were used. As initiators and regulators, 325 mg of alkoxyamine (IIa), 11 mg of nitroxide (Ia) and 12 mg of Vazo 88™ (DuPont) were admixed. The polymerization was conducted in accordance with the general implementation instructions for nitroxide-controlled polymerizations. For workup and further processing the procedure of Example 2 was adopted.

To determine the conversion, the polymerization was repeated and then the procedure of test method E performed.

Example 4'

28 g of acrylic acid, 20 g of methyl acrylate, 20 g of styrene and 332 g of 2-ethylhexyl acrylate were used. As initiators and regulators, 325 mg of alkoxyamine (IIa) and 11 mg of nitroxide (Ia) were used. The monomers and the nitroxides are mixed in xylene (85% strength solution in xylene), and the solution is degassed a number of times and then heated at 125° C. under an argon atmosphere. The reaction time is 24 h. Thereafter the conversion was determined by test method E.

Example 5

40 g of acrylic acid and 360 g of 2-ethylhexyl acrylate were used. As initiators and regulators, 325 mg of alkoxyamine (IIa), 11 mg of nitroxide (Ia) and 12 mg of Vazo 88™ (DuPont) were admixed. The polymerization was conducted in accordance with the general implementation instructions for nitroxide-controlled polymerizations. For workup and further processing the procedure of Example 3 was adopted.

Example 6

12 g of acrylic acid, 194 g of 2-ethylhexyl acrylate and 194 g of n-butyl acrylate were used. As initiators and regulators, 325 mg of alkoxyamine (IIa), 11 mg of nitroxide (Ia) and 12 mg of Vazo 88™ (DuPont) were admixed. The polymerization was conducted in accordance with the general implementation instructions for nitroxide-controlled polymerizations. For workup and further processing the procedure of Example 3 was adopted.

Example 7

8 g of acrylic acid, 4 g of methyl acrylate, 40 g of N-tert-butylacrylamide and 348 g of 2-ethylhexyl acrylate were used. As initiators and regulators, 325 mg of alkoxyamine (IIa), 11 mg of nitroxide (Ia) and 12 mg of Vazo 88™ (DuPont) were admixed. The polymerization was conducted in accordance with the general implementation instructions for nitroxide-controlled polymerizations. For workup and further processing the procedure of Example 3 was adopted.

Results

The comparison of examples 1 and 2 with 3 and 4 demonstrates the advantages of polyacrylate pressure sensitive adhesives prepared by nitroxide-controlled polymerization. The reference specimens (examples 1 and 2) were prepared conventionally in a free radical polymerization. For comparison, the polyacrylates in examples 3 and 4, with the identical comonomer composition, were prepared by nitroxide-controlled polymerization. The results of the polymerizations are illustrated in table 1:

TABLE 1

| Example | $M_W$ [g/mol] | Polydispersity PD |
|---|---|---|
| 1 | 489 500 | 5.9 |
| 2 | 532 000 | 6.3 |
| 3 | 378 000 | 2.8 |
| 4 | 393 000 | 2.9 |

As a result of the free radical polymerization, examples 1 and 2 exhibit a high polydispersity. Isopropanol as regulator reduces the average molecular weight but generally broadens the molecular weight distribution. As a result of the nitroxide-controlled polymerization, significantly lower polydispersities are obtained. Moreover, there is a distinct improvement in the hotmelt processing properties. For this purpose examples 1 to 4 were subjected to thermal loading and shearing in a hotmelt kneading apparatus at 140° C. for several hours. Thereafter the gel index was measured, in order to investigate the effect of the damage on the polymer. The results are illustrated in table 2:

TABLE 2

| Example | Gel index [%] |
|---|---|
| 1 | 11 |
| 2 | 8 |
| 3 | 0 |
| 4 | 0 |

Examples 1 and 2 show distinct aging after shearing load. The composition possesses a gel index of 8% (example 2) or 11% (example 1). Partially gelled polyacrylates cannot be applied either in the hotmelt process or from solution as PSAs. Consequently, aged PSAs of this kind are completely unsuitable for practical application. Contrastingly, examples 3 and 4 show no aging phenomena, such as gelling, for example. As a result of the nitroxide-controlled polymerization, the polymers contain nitroxides as end groups, which at high temperatures are able to act as radical scavengers in situ. As a result of the polymerization process, therefore, an aging inhibitor is incorporated directly into the PSA. The polyacrylates prepared by this route can be readily processed by the hotmelt process and, accordingly, can be used preferentially as PSAs.

In order to assess the technical adhesive properties the PSAs are compared with one another in table 3:

TABLE 3

| Example | SST (RT, 10 N) | BS-steel [N/cm] |
|---|---|---|
| 1 | 2475 | 3.8 |
| 2 | 3490 | 3.7 |
| 3 | +10 000 | 3.6 |
| 4 | +10 000 | 3.4 |

SST: Shear stability times
RT: Room temperature
BS: Bond strength

The narrower distribution of the molecular weights brings about a more efficient network in the case of EB crosslinking. The shear strength of the PSAs is raised. For an identical comonomer composition, examples 3 and 4 exhibit a much higher shear strength as compared with examples 1 and 2. The effect as far as the bond strengths are concerned is negligible.

In order to examine the efficiency of the preparation process of the invention, the conversion rate of examples 3 and 4 was measured. In parallel thereto, conventional nitroxide-controlled polymerizations were conducted which contained no additions of Vazo 88™ (DuPont) and thus do not represent an additional source of radicals which might accelerate the polymerization. The results from these comparative investigations are listed in table 4.

TABLE 4

| Example | Conversion [%] |
|---|---|
| 3 | 95 |
| 4 | 94 |
| 3' | 83 |
| 4' | 78 |

The conversion measurements demonstrate that the addition of Vazo 88™ considerably increases the polymerizations and that after a reaction time of just 24 h it is possible to achieve a conversion of well above 90%. The polymerizations conducted for comparison, without free addition of initiator (examples 3' and 4'), lie well below 90% and are therefore not very suitable for preparing acrylic PSAS, since residual monomers—even in a hotmelt concentration process—are very difficult to remove and these fractions present in the PSA tape product may give rise, for example, to skin irritations.

In order to examine the process of the invention for producing acrylic PSA tapes, further acrylic PSAs with different comonomer compositions were prepared by means of nitroxide-controlled polymerization. The results of the polyacrylates applied from the melt are illustrated in table 5.

TABLE 5

| Example | SST (RT, 10 N) | BS-steel [N/cm] |
|---|---|---|
| 5 | +10 000 | 4.0 |
| 6 | 6195 | 4.8 |
| 7 | 3680 | 5.0 |

SST: Shear stability times
RT: Room temperature
BS: Bond strength

Examples 5 to 7 demonstrate that other comonomers as well can be used. Thus it is also possible to prepare relatively soft acrylic PSAs which possess a higher bond strength on steel, for example. The shear strength of the acrylic hotmelt PSA described is also very high.

What is claimed is:

1. An initiator system for free-radical polymerizations, comprised of a combination of compounds of the formulae (I)

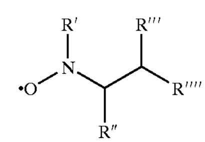

(II)

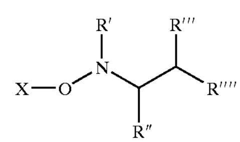

in which

R', R", R'", R"" are chosen independently of one another and represent a) branched and unbranched $C_1$ to $C_{18}$ alkyl radicals; $C_3$ to $C_{18}$ alkenyl radicals; $C_3$ to $C_{18}$ alkynyl radicals;

b) $C_3$ to $C_{18}$ alkynyl radicals; $C_3$ to $C_{18}$ alkenyl radicals; $C_1$ to $C_{18}$ alkyl radicals substituted by at least one OH group or halogen atom or a silyl ether;

c) $C_2$–$C_{18}$ hetero alkyl radicals having at least one oxygen atom and/or an NR group in the carbon chain; R being chosen from one of groups a), b), and d) to g), d) $C_3$–$C_{18}$ alkynyl radicals, $C_3$–$C_{18}$ alkenyl radicals, $C_1$–$C_{18}$ alkyl radicals substituted by at least one ester group, amine group, carbonate group and/or epoxide group and/or by sulfur and/or by sulfur compounds, especially thioethers or dithio compounds;

e) $C_3$–$C_{12}$ cycloalkyl radicals;

f) $C_6$–$C_{10}$ aryl radicals;

g) hydrogen;

X represents a group with at least one carbon atom wherein the free radical X• derived from X has the ability to initiate a polymerization of ethylenically unsaturated monomers and further comprising thermally decomposing radical-forming azo and/or peroxo initiators, wherein the compounds of formula (I) are present in a proportion of from 1 mol. % up to 10 mol. %, based on amount of the compounds of the formula (II), and/or the azo and/or peroxo initiators are present in a proportion from 1 to 10 mol. %, based on the amount of compound of the formula (II).

2. The initiator system of claim 1, wherein compound (I) is the compound of formula (Ia) and compound (II) is the compound of formula (IIa):

(Ia)

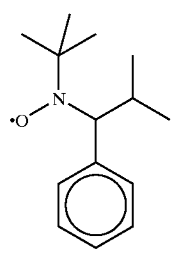

(IIa)

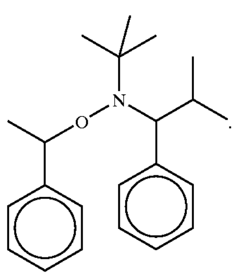

3. A process for preparing acrylic pressure sensitive adhesives, wherein a monomer mixture having at least 70% by weight of ethylenically unsaturated compounds is subjected to free-radical polymerization initiated by the initiator system of claim 1.

4. The process of claim 3, wherein said ethylenically unsaturated compounds are monomers of the formula

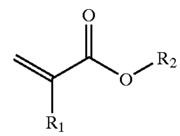

in which $R_1$=H or $CH_3$ and $R_2$=H or is an alkyl chain having 1–20 carbon atoms, or vinyl compounds are used as additional monomers, with a fraction of up to 30% by weight, or both.

5. The process of claim 3, wherein resin or other additives, selected from the group consisting of aging inhibitors, light stabilizers, ozone protectants, fatty acids, plasticizers, nucleators, blowing agents, accelerators fillers end combinations thereof are added to the monomer mixture or to the acrylic pressure sensitive adhesive.

6. The process of claim 3, wherein crosslinkers have been added to the polyacrylate composition to be crosslinked.

7. The process of claim 3, wherein the pressure sensitive adhesive is applied to a backing as a melt.

8. The initiation system of claim 1, wherein said amount of compounds of formula (I) is 3 mol. % to 7 mol. %, and said amount of azo and/or peroxo compounds is from 3 to 7 mol. %.

9. The process of claim 4, wherein said vinyl compounds are selected from the group consisting of vinyl esters, vinyl halides, vinylidene halides, nitrites of ethylenically unsaturated hydrocarbons, a combinations thereof.

10. The process of claim 6, wherein said crosslinkers are selected from the group consisting of difunctional acrylates, polyfunctional acrylates, difunctional methacrylates, polyfunctional acrylates, photoiniators and combinations thereof.

* * * * *

UNITED STATES PATENT AND TRADEMARK OFFICE

CERTIFICATE OF CORRECTION

PATENT NO. : 6,974,853 B2
APPLICATION NO. : 10/343181
DATED : December 13, 2005
INVENTOR(S) : Husemann et al.

It is certified that error appears in the above-identified patent and that said Letters Patent is hereby corrected as shown below:

Column 1, following line 11, insert -- Background of the invention --

Column 1, Lines 32-33, "process in" should read -- process. In --

Column 2, following line 63, insert -- Summary of the invention --

Column 3, following line 44, insert -- Detailed description --

Column 4, Line 4, "C6-C10aryl" should read -- $C_6$-$C_{10}$ aryl --

Column 5, Line 29, "Monomers," should read -- monomers, --

Column 8, Line 39, "procedure adopted" should read -- The procedure adopted --

Column 8, Line 60, "580° C." should read -- 58° C --

Column 8, Line 62, "750° C." should read -- 75° C --

Column 12, Line 64, "or halogen atom" should read -- or a halogen atom --

Column 14, Line 24, "accelerators fillers end" should read -- accelerators, fillers and --

Column 14, Line 39, "a combinations thereof." should read -- and combinations thereof. --

Signed and Sealed this

Fourth Day of May, 2010

David J. Kappos

David J. Kappos
*Director of the United States Patent and Trademark Office*